Nov. 22, 1966  F. DÖRGE  3,287,028
DETACHABLE BALL TYPE COUPLING MEMBER FOR USE IN CONNECTION
WITH DRAWBARS FOR AUTOMOBILE TRAILERS
Filed Oct. 23, 1964  3 Sheets-Sheet 1

INVENTOR
FRANZ DÖRGE

BY McGlew and Toren
ATTORNEYS

Nov. 22, 1966          F. DÖRGE          3,287,028
DETACHABLE BALL TYPE COUPLING MEMBER FOR USE IN CONNECTION
WITH DRAWBARS FOR AUTOMOBILE TRAILERS
Filed Oct. 23, 1964          3 Sheets-Sheet 2

INVENTOR

FRANZ DÖRGE

BY McGlew and Toren

ATTORNEYS

Nov. 22, 1966  F. DÖRGE  3,287,028
DETACHABLE BALL TYPE COUPLING MEMBER FOR USE IN CONNECTION
WITH DRAWBARS FOR AUTOMOBILE TRAILERS
Filed Oct. 23, 1964  3 Sheets-Sheet 3

INVENTOR
FRANZ DÖRGE

BY McGlew and Toren
ATTORNEYS

United States Patent Office 3,287,028
Patented Nov. 22, 1966

3,287,028
DETACHABLE BALL TYPE COUPLING MEMBER FOR USE IN CONNECTION WITH DRAWBARS FOR AUTOMOBILE TRAILERS
Franz Dörge, Hindenburgstrasse 52,
Moglingen, Germany
Filed Oct. 23, 1964, Ser. No. 406,081
Claims priority, application Germany, Nov. 11, 1963,
D 42,908
2 Claims. (Cl. 280—495)

The present invention relates to a detachable ball type coupling member or two-section drawbar for use in connection with the drawbars for automobile trailers.

To an increasing extent, passenger motor vehicles are being used for the transportation of smaller loads in that a single-axle trailer is coupled to the passenger car with the aid of a suitable coupling arrangement. The most commonly used type of coupling arrangement consists of a drawbar which is mounted on the motor vehicle, and is bent upwards at the rearward end of the vehicle. This drawbar terminates in a ball-shaped head with which there is engaged the coupling member that is arranged at the pole of the trailer. To this end, the ball head must be positioned with a sufficient clearance space behind the rear bumper of the car.

The portion of the drawbar projecting over the rear bumper is noticed disagreeably in all cases where the passenger car is not being primarily used as a traction engine. On the other hand, the projecting ball-end bears certain disadvantages, such as the tendency to soil clothes. Various suggestions have already been made as possible ways for overcoming these drawbacks. One of these possibilities resides in screwing the ball type coupling member into a thread provided in a sleeve member of the drawbar, with a corresponding thread profile also being cut into the ball type coupling member. This way of mounting, however, has some disadvantages insofar as the thread and the fitting into the ball sleeve require a certain play, and because the device cannot be prevented from producing a rattling noise as the result of the forces acting thereon. Moreover, on account of the necessary tolerance between the ball-shaped end of the drawbar and the sleeve, a soiling and the penetration of water during the movement (driving) is unavoidable and is likely to affect the detachability of the device.

Another known proposal is aimed at using a bayonet-type lock instead of the screw arrangement. Such a coupling arrangement, however, is likewise susceptible to the danger of dirt incrustation. On the other hand, the entire tensile force has to be absorbed by the relatively weak bolts of the bayonet-type catch. An unlimited strengthening or reinforcement of these bolts cannot be carried out for technical reasons.

Another conventional type of coupling arrangement therefore, is designed in such a way that the ball type coupling bar can be pushed backwards and forwards into two discrete positions. The bar is secured in both of the positions by means of a bayonet-type catch. Even with this solution, the ball type coupling member will still remain visible in any case.

While the last-mentioned prior art coupling arrangement may be referred to as a semi-detachable one, the ball type coupling member remains firmly connected to the motor vehicle according to a further conventional proposal, thus avoiding the aforementioned disadvantages of the detachable ball type coupling members. In the device according to this earlier proposal, the ball type coupling member is reduced in size to an extent such that the ball will come to lie inside the rear bumper. This, however, requires the centre portion of the rear bumper to be removable or detachable. The disadvantages of the device according to this arrangement are obvious. A particular disadvantage is that none of the commercially available rear bumpers can be used to this end.

The present invention is based on the problem of avoiding the disadvantages as mentioned hereinbefore. It is the object of the invention to provide a detachable ball type two-section drawbar for the use in connection with the drawgears of passenger motor vehicles.

In accordance with the invention, the coupling sleeve consists of two half shells capable of being swung open on hinges, and the ball type coupling member itself is provided at its end remote from the ball-shaped head, with changes of cross-sectional area (bulgings and/or constrictions) engaging into corresponding recesses provided in the half shells and effecting the force-locking connection between the ball type coupling bar and the coupling sleeve member. Finally, means are provided for securing the inserted ball type coupling member against it being turned or twisted. At their ends facing the ball-shaped head, the two half shells may be screwed to one another. A modified way of securing the shells involves pressing the two half shells together by means of a wedge which is protected in a suitable way from falling out. The torsion or twist protection may be effected by providing a nose or projecting portion on the ball type coupling member for engaging a correspondingly cut out recess (groove) provided in one of the two half shells.

The novel type of coupling arrangement has the advantage that, on one hand, there is provided a large surface for absorbing the tensile forces and that, on the other hand, the danger of incrustation is no longer of any noteworthy significance, because any dirt which may have entered the sleeve member in one way or another will either drop or fall out on its own, or can be easily removed upon swinging open the two hinged half shells. In addition thereto, it is also possible to cover the sleeve member with a cap. An added advantage is to be seen in the fact that the holder of the ball type coupling bar is prevented from being deflected, because the two half shells can be firmly pressed against the ball type coupling member by way of tightening the screws or the wedge, respectively, this reliably avoiding any rattling noise during operation.

The above-mentioned features and objects of this invention will become more apparent by reference to the following detailed description taken in conjunction with FIGS. 1 to 3 of the accompanying drawings, in which:

FIG. 1b is a side elevation view corresponding to FIG. 1a;

FIG. 1c is a transverse sectional view on the line A—A of FIG. 1a;

Figure 1A:
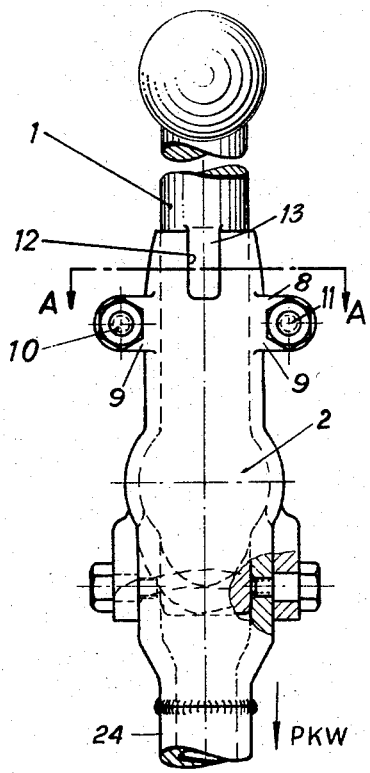
FIG. 1a is a top plan view of the essential parts of one form of a coupling arrangement embodying the invention.
Figure 1B:
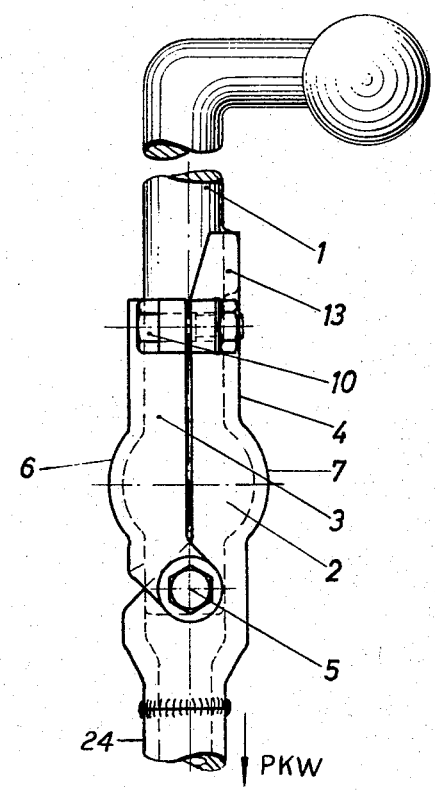
Figure 1C:
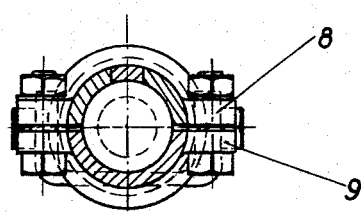
Figure 2A:
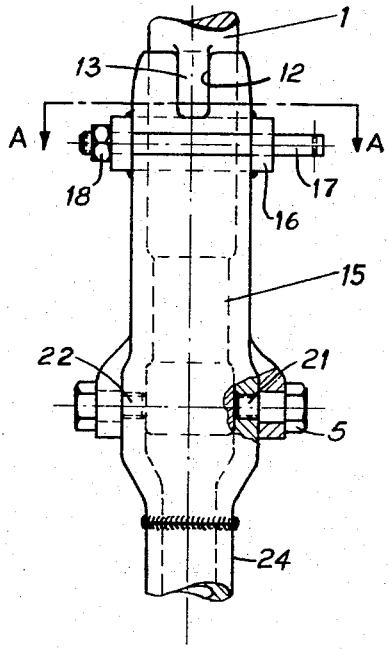
Figure 2B:
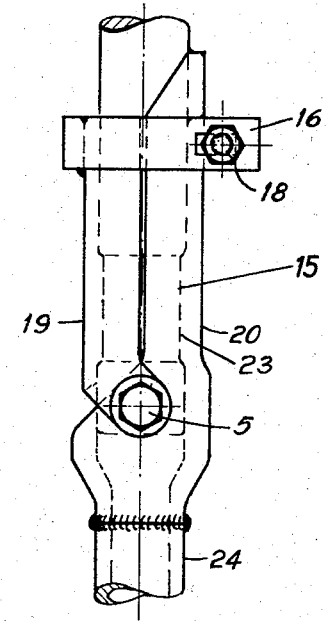
Figure 2C:
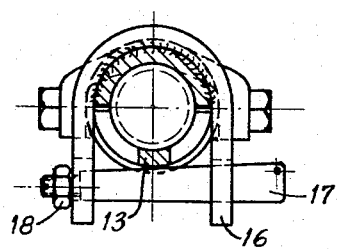
Figure 3A:
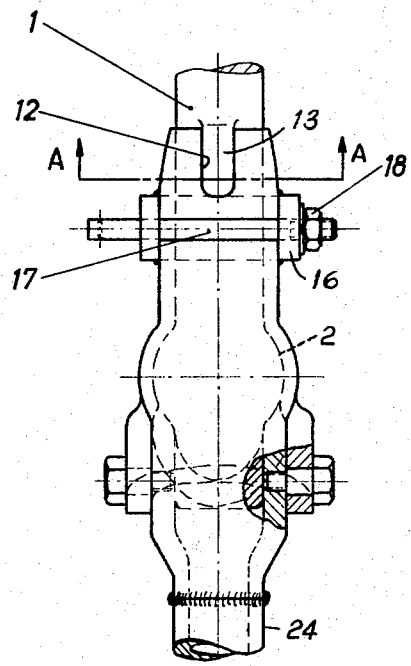
Figure 3B:
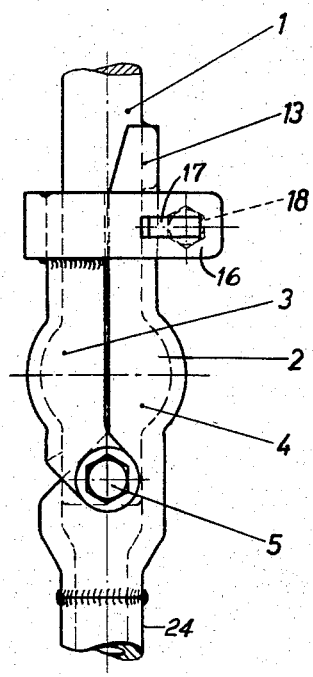
Figure 3C:
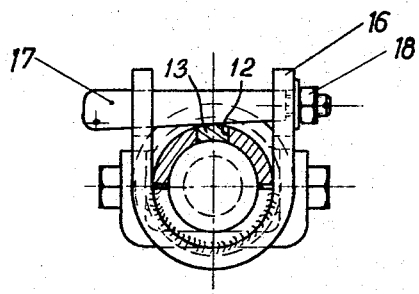

FIGS. 2a, 2b and 2c are views, corresponding respectively to FIGS. 1a, 1b and 1c, of the essential parts of another form of coupling arrangement embodying the invention; and FIGS. 3a, 3b and 3c are views, corresponding respectively to FIGS. 1a, 1b and 1c, of the essential parts of still another form of coupling arrangement embodying the invention.

In all three of the exemplified embodiments corresponding parts are indicated by the same reference numerals.

The coupling arrangement, or two-part drawbar, according to FIGS. 1a to 1c consists of the ball type coupling bar or drawbar 1 which, at its end remote from the ball head, comprises the bulged-out portion 2. The coupling sleeve member consists of the two half shells or half sleeves 3 and 4 which are hinged about the shafts 5 for swinging between open and closed positions. At the points 6 and 7, the two half shells are widened to an extent such that the bulging Z of the ball type coupling bar 1 can be accommodated therein. The half shells are provided the flanges 8 and 9 adjacent their free ends, with the holes of these flanges receiving screws 10 and 11. With the aid of these screws, the two half shells can be firmly tightened to the neck of the ball type coupling member. Unlike the half shell 3, the half shell 4 comprises an extension formed with a notch 12 adapted to be engaged by a projection (nose) 13 of the ball type coupling bar 1, thus preventing the latter from being twisted. Shafts 5 are engaged in a drawbar section 24 connected to the towing vehicle.

FIGS. 2a through 2c illustrate another embodiment of the invention wherein the coupling rod is formed with a reduction in cross section as indicated 15. The two half-pans or half-sleeves 19 and 20 are hinged together at pins 21 and 22, so as to be swingable between opened and closed position in such a manner that half-sleeve 19 has a limited pivotal movement about pins 21 and 22. The inner profiles 23 of the half-sleeves are designed so that they conform exactly to the cross sectional variations in coupling rod 14 and therefore in the closed state of the half-sleeves 19 and 20. These half-sleeves conformingly engage coupling rod 14 in surface-to-surface engagement. The member 24 is connected to the towing vehicle, and the wedge connection 16, 17, 18 will be explained with reference to FIG. 3.

The embodiment as shown in FIGS. 3a to 3c differs from the first example of embodiment only as regards the way in which the two half shells are secured in position. Just like in the example of FIGS. 2a to 2c, the problem of fastening the two half shells is solved with the aid of a wedge which is secured against falling out. For this purpose there is provided the clip or clamping device 16, whose free limbs have apertures through which the wedge 17 is inserted. Wedge 17 is protected from falling out by the action of a nut 18 threaded on an extension of wedge 17. Since the two limbs of the clip member 16 are somewhat resilient, this clamping device permits the two half shells to be separated easily from one another. As illustrated in FIGS. 2 and 3, the clip member 16 may be welded to one of the two half shells. Alternatively, however, it may also be designed in a way permitting it to be loosely slipped on, and protected against displacement or shifting by the provision of suitable means.

It is to be understood that the foregoing description of specific examples of this invention is in no way to be considered as a limitation on its scope; thus, for example, instead of the one change of cross-sectional area at the ball type coupling member there may be provided two or more. Likewise, the problem of providing a screw arrangement for the two half shells may be solved by using a capped screw or hinge bolt. In all three of the exemplified embodiments, the ball head is positioned at the end of the member 1 or 14, as shown in FIGS. 1a and 1b. Also, in all three embodiments, the member 24 is connected with the towing vehicle as indicated at PKW.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. In a trailer hitch for disengageably coupling a towed vehicle to a towing vehicle and of the type including a relative elongated drawbar connected at one end to one vehicle and having at its opposite end one element of a disengageable ball and socket coupling, with the other element of the ball and socket coupling being connected to the other vehicle: the improvement in which said drawbar comprises first and second relatively elongated sections which are substantially rectilinearly alignable with their inner ends in adjacent relation, the outer end of said first section being connected to said one vehicle and the outer end of the second section having one ball and socket coupling element thereon; said second section, adjacent its inner end, having a zone in which its cross section differs from that of the remainder of its length; the inner end of said first section having extending therefrom a pair of relatively separable and elongated half-sleeves conjointly forming a relatively elongated substantially complete sleeve conformingly embracing and extending along said second section through a substantial distance from the inner end thereof through and substantially beyond including said zone, which distance is a multiple of the length of said zone, said half-sleeves having surface-to-surface conforming engagement with said second section, including said zone, throughout the length of said zone and throughout said distance; said half-sleeves being hingedly interconnected at said first section for swinging apart of their free ends to disengage said second section; and clamping means, including threaded fastener elements, engaged with the free ends of said half-sleeves, and operable to clamp said half sleeves in tightly embracing relation with said second section.

2. The improved drawbar, as claimed in claim 1, in which said clamping means comprises a U-shaped yoke embracing the free ends of said half-sleeves and having apertures in its legs, and a wedge extending through said apertures and engaged with one of said half-sleeves, and having a threaded end provided with a nut to draw said wedge tight.

References Cited by the Examiner

UNITED STATES PATENTS

| | | | |
|---|---|---|---|
| 606,914 | 7/1898 | Bragger | 287—87 X |
| 626,223 | 6/1899 | Cramp | 287—111 |
| 865,056 | 9/1907 | Palmer | 287—111 X |
| 1,218,631 | 3/1917 | DeMonts. | |
| 1,641,038 | 8/1927 | Koppin | 287—118 X |
| 1,683,516 | 9/1928 | Adams | 287—111 X |
| 1,947,959 | 2/1934 | Williston | 287—111 X |
| 2,486,483 | 11/1949 | Landen | 287—87 X |
| 2,639,160 | 5/1953 | Studebaker et al. | 280—495 |

BENJAMIN HERSH, *Primary Examiner.*

C. C. PARSONS, *Assistant Examiner.*